May 22, 1928.

G. HUTCHINSON

WEIGHING MECHANISM

Filed Dec. 11, 1925

Inventor
George Hutchinson
By B. Singly
Attorney

May 22, 1928.

G. HUTCHINSON 1,670,576

WEIGHING MECHANISM

Filed Dec. 11, 1925

Inventor

George Hutchinson

B. Singly

Attorney

Patented May 22, 1928.

1,670,576

UNITED STATES PATENT OFFICE.

GEORGE HUTCHINSON, OF SHEBOYGAN, WISCONSIN, ASSIGNOR TO HUTCHINSON SCALE COMPANY, OF SHEBOYGAN, WISCONSIN, A CORPORATION OF WISCONSIN.

WEIGHING MECHANISM.

Application filed December 11, 1925. Serial No. 74,793.

This invention relates to improvements in weighing mechanisms.

It is an object of the invention to provide an improved loose weight adapted to be removed from or applied to the operative elements of the weighing mechanism so as not to enter or to enter respectively, into the calculation of the actual load to be weighed.

It is also an object of the invention to render this improvement applicable to loose-weights which only enter into the calculation of the actual load to be weighed when they are removed from an operative part.

The first form of use of the loose-weights may be termed "the positive use" while the second form of use may be termed "the negative use" of loose-weights, and dependent upon the form of use the weights themselves may be designated "positive" or "negative" loose-weights.

It is also an object of the invention to improve the support or part of the weighing mechanism on which the loose-weights rest while they are in inoperative and in operative position respectively.

Another object of the invention is to improve the arrangement of loose-weights and their supports on weighing mechanisms in order to facilitate the transfer movement from operative to inoperative position and vice versa, this transfer being facilitated not only by the speed at which the movement from one position to the other may be effected, but also by the readiness with which the transfer may be accomplished, to eliminate as much as possible any errors, whether the weights be used as positive or negative loose-weights.

It is furthermore an object of the invention to provide in connection with a weighing mechanism and supports for loose-weights of the same, surface portions or bearing elements on the supports as well as on the detachable weights, for effecting this transfer from one position to another, even though the weight would have to move from a lower position to a higher one. The object is, therefore, to produce a weight and support for the same, the weight being adapted to readily climb up to a new position or descend to a new position without calling for time consuming manipulations on the part of the attendant.

It is also an object of the invention to provide in connection with a weighing mechanism a loose-weight having a center of gravity located at a relatively long distance from the support of the weight in order to facilitate the transfer movement of the weight from one position to another by tipping the weight or tilting the same. The bulk of the weight is arranged with respect to its base in such manner that the distance of the center of gravity from the point of support for the weight is considerably greater than the radius of a solid circular weight of the same value, cubic content and surface area.

The center of gravity of weight is located in the present weight relatively high above the base, without sacrifice of the compactness of the weight, the selected shape being preferable over a circular ring, in which the radius may be as large as the distance of the center of gravity from the base in the weight according to the present invention, but the circular ring, owing to its bulk, would not lend itself as readily to simple manipulation as the present weight.

It is also an object of the invention to provide in a scale a pair of weight supports, relatively movable to each other in such manner that either one may be at an elevation higher than the other, and to combine with these supports or benches a loose-weight adapted to stand in readiness on the lower bench in a sloping position so that a portion of the weight projecting from said lower bench is located higher than the bench of higher elevation, whereby the transfer to the higher bench even takes place by a tilting movement of the weight.

It is also an object of the invention to provide a weight of a shape which will facilitate an oscillatory transfer movement. The path of the center of gravity of the weight while the latter is transferred from one position to another is formed by a broken curve comprising several sections which are not necessarily of equal length.

Another object of the invention is to provide the supports for the loose-weights in the form of shelves on carriers which are suspended from the beam and from a fixed part of the scale respectively, the individual shelves being each adapted to seat a certain size of weight only, whereby the transfer movement by tilting of the various weights from a shelf on one carrier to the shelf of another carrier is facilitated.

With these and numerous other objects in view, several embodiments of the invention have been described in the following specification in which reference is made to the accompanying drawings, wherein.

Figure 1:
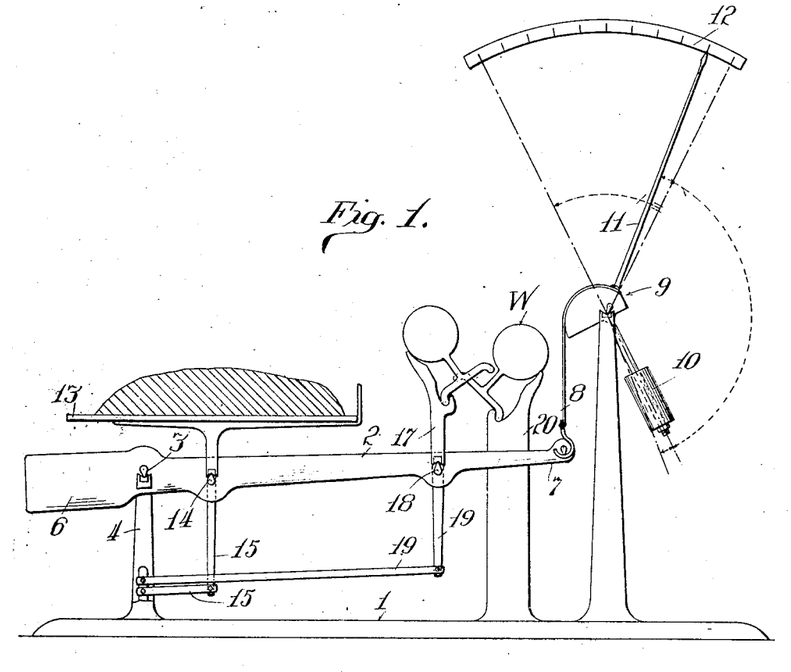
Figure 1 is a diagrammatic sectional view of a counter scale, illustrating the use of the improved loose-weights on a scale of this character, altho obviously other forms of scales may be utilized.
Figures 2, 4:
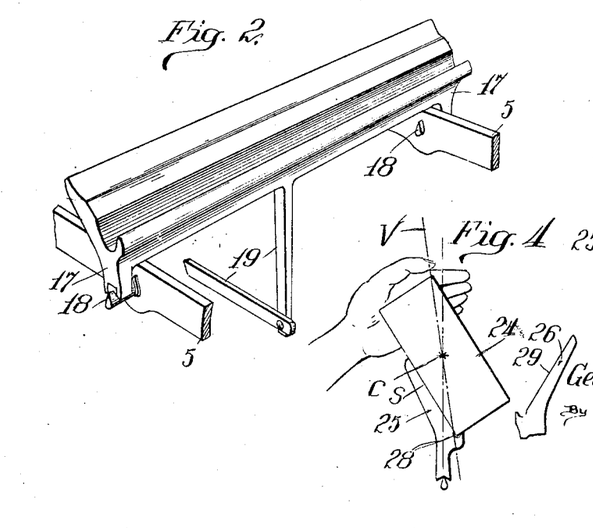
Fig. 2 is a perspective fragmentary view of a portion of a scale beam showing an improved form of a support for a loose-weight floatingly supported in the scale.
Fig. 4 shows the same weight in use.

The weighing mechanism or scale indicated by way of example in Figs. 1 and 2 shows an ordinary frame 1, as commonly used in scales of this character, with a scale beam 2 suitably supported by knife edges 3 on standards 4 of the frame. As shown in Fig. 2 the beam 2 comprises a pair of parallel arms 5 carrying on one side of the fulcrum 3 a counterweight 6 which may be integral with the arms, the free end 7 of the beam being connected by a flexible tension member 8 with an indicator mechanism indicated as a whole at 9 and comprising in the embodiment selected a pendulum 10 and a pointer 11 adapted to play over an indicator scale 12. A pan 13 for receiving the material to be weighed also is supported on knife edges 14 of the beam 2 and its movement relatively to the frame of the scale is controlled in an ordinary way by check links 15.

In order to enlarge the capacity of the scale beyond that normally indicated by the dial 12 over which the pointer 11 plays, it is customary to place a loose-weight on the beam, said loose-weight having a value for enlarging the weighing capacity to a predetermined degree. So it may be assumed, for instance, that the weight W, shown in Figure 1, as being taken off the beam, has a capacity of ten pounds. This value, therefore, would have to be added to the reading indicated by the pointer on the dial to show the actual value of the material resting on the goods-pan.

The operative support for the loose-weight is illustrated in Figures 1 and 2 as a transverse member or bench 17 resting on knife edges 18 which are secured to the beam 2, and this floating support is again controlled in its movement relatively to the beam 2 and to the frame 1 by a set of check links 19 of any desired construction. When it is desired, however, to weigh material the value of which is within the dial capacity of the scale, the loose-weight W will be left on the beam 2 and for the purpose of retaining this loose-weight in this inoperative position another similar support or bench 20 is associated with the frame of the scale, which last named bench, however, is a waiting or stationary bench as contrasted with the floating bench resting on the movable beam.

Various forms of weights may be selected to facilitate the transfer of any one or several, or all, of a number of loose-weights from one of these benches or supports to the other one. It would seem that a cylindrical weight would recommend itself primarily owing to the simplicity of form, and possibly also owing to the ease of rolling movement which can be communicated to a cylindrical weight. It should be noted here, however, that the transfer movement cannot be a rolling movement since the two supports, on either of which the weight is supposed to come to rest, are necessarily not located on a contiguous part or element of the weighing mechanism but on two different parts separated from each other by a gap.

Height of waiting bench.

The waiting bench 20 is placed at such elevation that it registers with the floating bench or beam-bench when the beam is at its midstroke. Accordingly, in weighing, if the load is heavy it sends the beam down (in the case here shown, Fig. 1, the negative use); and hence the weights must step uphill to get off the beam, onto the waiting bench. Later, when the load is removed, the beam drops, and the step the weights must take is again an uphill one, to get back onto the beam ready for the next load.

Accordingly the uphill step is the more frequent one, and the placing of the waiting bench to accord with the beam's midstroke, as aforesaid, equalizes the steps.

Distance between benches.

The benches are set at such distance apart as is found to accord best with the height of the stepup, to give an incline, say for example of thirty degrees. And the width of the claw-base of the tilting loose-weights is made such that the base can span or straddle the diagonal distance between the two benches, when the beam is at either extreme of its stroke.

In an automatic scale (computing or otherwise), the beam necessarily swings through a longer stroke than does the beam of, say, an ordinary platform scale. That is because the former has the duty of actuating the pendulum through the whole of the deflection of the latter.

Therefore the uphill step in a computer is higher than in a platform of same length of beam. This makes it desirable to set the two benches further apart, which in turn, calls for a wider base on the tilting loose-weight.

Figures 11, 12, 13, 14, 15:
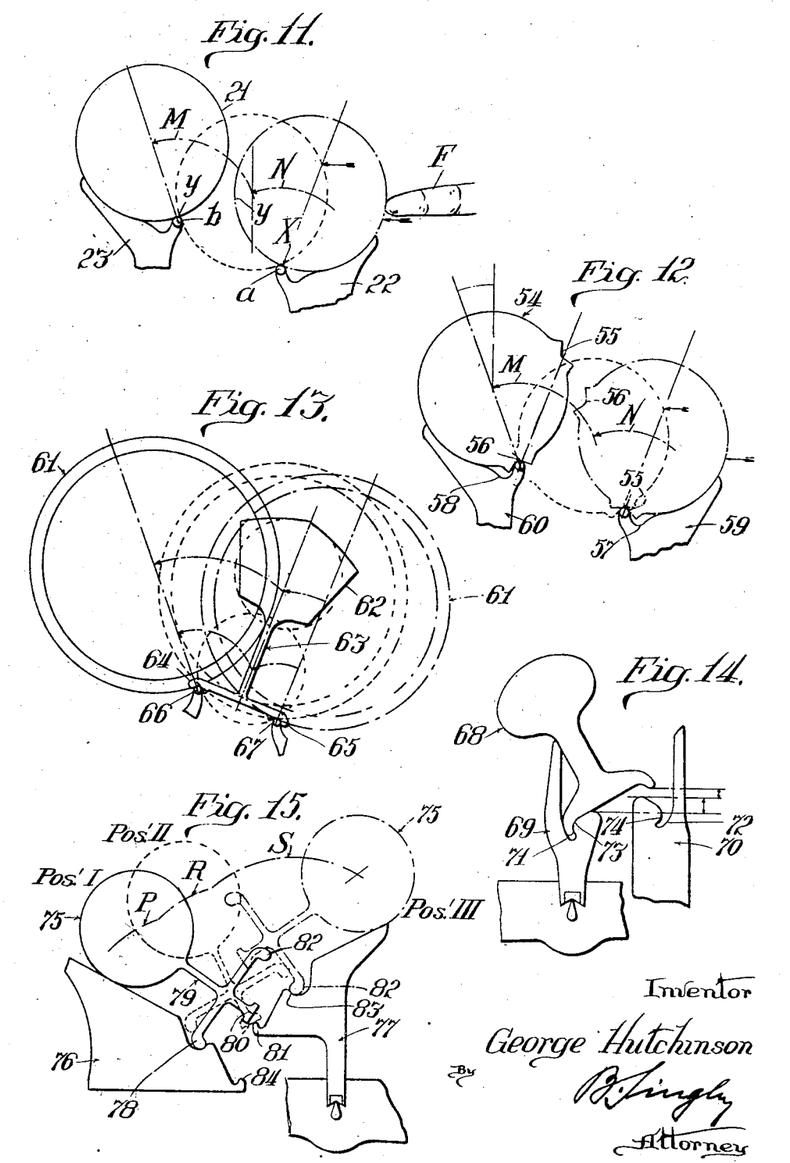
Figs. 11 to 13 inclusive are diagrammatic elevations illustrating the comparison of circular disc and ring weights respectively with weights of the character forming the subject matter of the present invention, Figure 11 showing an ordinary disc weight and the transfer movement indicated by the path of the center of gravity described during said movement, Figure 12 showing a disc weight on which the transfer movement is facilitated thru the addition of suitably selected bearing points on the weight, and Figure 13 illustrating a type of improved weight of the present invention as compared with a circular ring weight of the same face area, cubic content and value.
Fig. 14 shows in side elevation and partly in section another embodiment of the improved weight and supports.
Fig. 15 illustrates in a similar way a form of the loose-weights with its supports and also shows the path of the center of gravity described during the transfer movement.

From Figure 11 it will be seen that a cylindrical weight 21 would present difficulties against any tilting transfer movement, as the cylinder, instead of merely rolling, would have to rock successively about at least two points on its circumference, these points being those with which the bearings $a$ and $b$ of the two benches 22, 23 successively come into contact. The cylinder or disc 21, as shown in this Figure 11, therefore, would first have to be rocked about the point X of its circumference (which contacts the bearing surface $a$) until another point $y$ of its circumference engages or strikes the point $b$ of the other support 23. In order to bring this disc or cylinder then into a position of rest on this companion support 23, it would again be necessary to impart an additional rocking tilting movement to the disc on the bearing surface $b$ of said second support until the cylinder 21, transferred from a position of rest on support 22, would come to a position of rest on the support 23. In this transfer movement the center of gravity of the disc, which naturally will lie on the axis thereof as indicated at 24, would describe two curves M and N, each formed by an arc of a circle having a radius equal to that of the disc, one of these arcs being struck from one bearing point $a$ and the other one from the other bearing point $b$.

In carrying out a transfer movement of this kind with an ordinary disc it has been found that the tilting of a smooth disc about a point on its circumference is difficult to accomplish. Instead of rocking about the point the disc has a tendency to slide circumferentially on either one of the supports, and a twisting movement will be imparted to the disc, with the result that the transfer does not take place in the desired way. It would also be necessary to apply this force either in an upward direction instead of in horizontal direction, or to apply it considerably above the center of gravity, and in either case a component of the force applied would have a tendency to impart a downward movement to the disc. So for instance the finger F, shown in Figure 11 in a position to effect the transfer obviously would have to be applied at a point of the circumference which is located at a higher elevation from the support than the center of gravity, i. e. the center of the disc.

The above remarks will prove conclusively that no matter what the value of a cylindrical disc or weight may be it is not suitable for effecting a smooth and uninterrupted readily feasible transfer movement of a loose-weight from a position of rest to an operative position, or vice versa, especially where the step is a high one.

The considerations which led to the development of the various forms of weight used in the present invention are therefore those which facilitate the tilting for transfer to a higher level, and for this purpose it seems advisable to provide the supports and the weights with mutually cooperating surface portions or bearings particularly shaped to facilitate this tilting or tipping movement.

Figure 3:
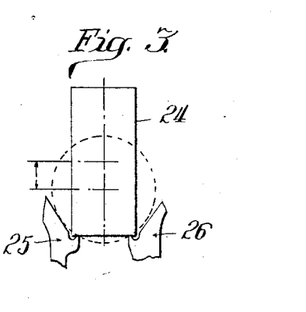
Fig. 3 is a diagrammatic elevation of a simple form of a loose-weight in an operative position, accompanied by a diagrammatic illustration of a circular weight of the same value.

A simple form of the weight with which this tilting or tipping may be accomplished is shown in Figures 3 and 4, and comprises, for instance, an ordinary rectangular block 24 of metal with a substantially flat base adapted to rest on supports 25, 26 or on either of them, in such manner that a relatively large portion of the base projects beyond said support, while the weight itself is maintained in a position of rest on either support in a sloping or slanting relation. A line V passing through the center of gravity $c$ and also through a surface bearing portion $s$ of the support is a sloping line, to impart stability to the weight while on the support. This form has the great advantage over a cylindrical or disc form of the weight having the same weight value and width, that the center of gravity in the improved weight is at a greater distance from the bearing point about which the tilting is to be effected than in a cylinder or disc which is added to this figure to clearly show the difference in the distance of the center of gravity from the supporting points.

The weight 24 with the substantially flat base rests slopingly on the support 25 and is adapted to be readily tilted from this support to the other. Owing to the relatively large leverage with which a hand applied to the upper corner of the weight acts on the fulcrum 28, the transfer to the other terminal position may be effected with little effort and the weight, after having once been tipped to engage the bearing surface 29 of the companion support 26 and the motion having been continued until it overbalances, will automatically drop into that sloping position in which it remains at rest on the second support 26.

While in this form of weight the tipping or tilting transfer movement is facilitated through the arrangement of an absolutely flat base, it is obvious that through suitable formation of the bearing points on the supports and corresponding formation of the bearing points on the weight, this oscillating movement may even be still more facilitated. The weight may be provided with surface portions in angular relation to each other, and each of these sets of surface portions are adapted then to engage correspondingly related surface portions on one of said supports.

Figure 5:
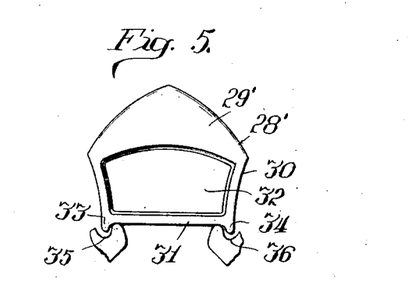
Fig. 5 is an elevation of a modification of the loose-weight.
Figure 6:
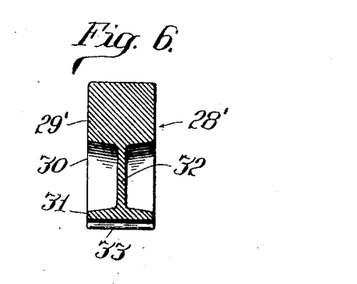
Fig. 6 is a central section through this modification.

A diagrammatic arrangement of this character is indicated by way of example in the simple form of weight shown in Figures 5 and 6. The weight 28' comprises a mass or bulk portion 29' and a relatively wide flange 30, the bulk 29' being opposite the substantially flat base 31. The entire structure is reinforced by a central web 32 of any desired thickness. Owing to the bulk being located at a distance from and opposite the base, and owing to the angular arrangement of the bearing surface portions 33, 34, about which the weight oscillates, it is obvious that here also the distance of the center of gravity from the points of oscillation is favorable to a tilting movement and that a compact form of weight is produced, the transfer of which could easily be accomplished even if the base would be entirely flat as in the embodiment of Figures 3 and 4. In order to assist, however, in this transfer movement the base 31 of the weight is provided near each end with surface portions 33, 34 in angular relation to each other so as to provide means for cooperation with angularly arranged surface portions 35, 36 of the supports. Owing to this angular arrangement of the bearing surface elements, the weight will readily be retained in definite relation to either support and will be restrained from movement axially or at an angle to the axis on either one of these supports, while without these angularly related surface portions, near the corners of the lower margin of the weight a twisting of the weight on its support might readily occur.

Similar bearing elements in angular relation to each other are also illustrated in the form of the weight shown in Figures 7 and 8, which again unites the form of the ordinarily disc 37 with the advantages of having its center of gravity at a relatively large distance from the supporting surface. It also has surface elements adapted to cooperate with surface portions on the support for restraining accidental movement of the loose weight while on either support. As in the weight shown in Figures 5 and 6, the weight is provided with surface elements 38, 39 functionally complementary to surface elements of the supports. The elements 38, 39 projecting from the base 42 of the weight are adapted to enter receding surface elements on the supports (not shown). The weight illustrated in Figures 7 and 8 comprises therefore a mass 37 of substantially cylindrical shape and a foot portion or bracket 43 secured to the same. The cylindrical mass 37 is rounded at its end surfaces, as indicated at 44, to facilitate their passing each other and to facilitate the handling of the same. It is also preferably provided with a more or less shallow circumferential groove 45 adapted to act as a guide for the finger which is applied to the outer surface of this disc when it is desired to tilt the weight from one position to another.

Figure 7:
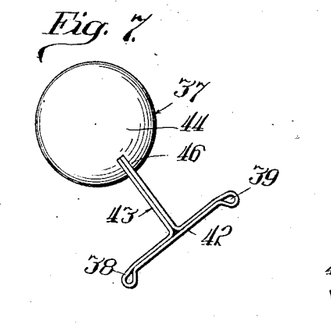
Fig. 7 illustrates in side elevation another form of a loose-weight which lends itself particularly to use on counter scales.
Figure 8:
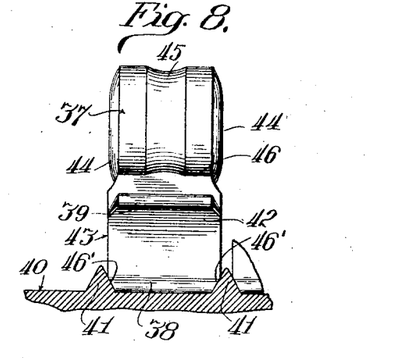
Fig. 8 is a front elevation of the loose-weight element illustrated in Fig. 7 with a sectional fragmentary view of a guide and support for the same.

The bracket or foot 43 is shown here as being made of sheet metal firmly fixed in the cylindrical part 37, a portion of the sheet metal bracket being bent on itself and being forcibly inserted into a radial recess or slot 46 of the cylindrical mass wherein it is firmly held in some suitable approved way. The shank of the supporting bracket 43 is enlarged at the opposite end by angular extensions, and these angular extensions again terminate in surface elements 38, 39 angularly related to each other.

Figure 9:
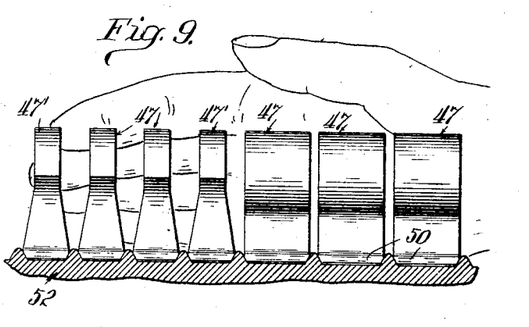
Fig. 9 is an elevation of a series of modified improved loose-weights.

An additional feature of importance for facilitating the transfer movement of this tiltable loose-weight is to be seen in the arrangement of guides on the supports, as shown in Figure 8, said guides being formed by ribs 41 suitably spaced from each other and projecting from the upper surface of the support 40 and sloping laterally; the marginal portions of the bracket for the weight being correspondingly reduced at their ends, as indicated at 46' to drop freely between these guiding portions 41 whereby also axial movement of the loose-weight while on either support is very effectively prevented. The weights—and there is usually a series of weights on each scale—are therefore held permanently in predetermined mutual distance from and relation to each other, whether they are all resting on the floating or on the stationary bench, and the attendant may therefore readily transfer, as desired, any one out of a series of these weights from one support to the other, or he may transfer, as shown for instance in Figure 9, the entire series from one bench to the other. This transfer of more than one of these weights by a single movement of the hand is, furthermore, readily attained by the fact that regardless of the value of these weights they have approximately the same profile and exactly the same height. In Figure 9, for instance, several loose-weights 47, 47' forming a series are shown, and the possibility for variably increasing the load capacity of the scale is enhanced by providing within this series pluralities of weights of equal values. As shown in the drawing, there are three individual weights 47 of one pound each, and four individual weights 47' each of one-fourth of a pound, all of these weights having the same height and permitting the hand to rock them through the same angle by a single movement of the hand.

Figure 10:
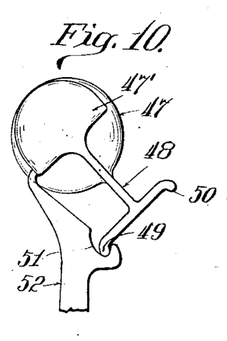
Fig. 10 is a side elevation of two of these weights, of different profile.

In this modification also the weights are retained in either terminal position at a slant to a vertical, as shown in Figure 10, whereby the oscillatory movement may readily be initiated. The supporting bracket of the bulk shown in the embodiment of Figures 7 and 8 as a separate part of the weight is shown in Figures 9 and 10 as being an integral part of the mass. This bracket or foot portion 48 again has projecting surface elements 49, 50 adapted for cooperation with receding surface elements 51 of the support 52 and the two projecting surface elements 49, 50 are adapted to act successively as centers of oscillation in the transfer of this loose-weight from either support to the other. This succession of action of the two projecting surface elements will be apparent from Figure 4 and also from Figure 13, in which latter the path described by the center of gravity of the weight during the transfer movement is more clearly indicated.

While the disadvantages of an ordinary disc weight 21, Figure 11, even under suitable selection of supports 22, 23 have been set forth, it will now become apparent that a disc weight may readily be improved to become more suitable for transfer movement, when bearing elements or definite centers of oscillation are provided on its circumference. Owing to the provision of suitably spaced surface portions 55, 56, Figure 12, on a disc weight 54, the portion of the circumference located between said surface portions 55, 56 practically becomes the "base" of this circular weight 54. The disc 54 is provided with projecting and receding surface portions adapted to cooperate with receding and projecting surface portions 57, 58 respectively of the two supports 59, 60. The path of the center of gravity described during the transfer movement of this weight 54 from one support to the other is indicated by the arcuate lines corresponding to the lines M and N of Figure 11 and which show a pronounced dip formed through the drop of the bearing elements 56 (on the weight) upon the bearing portion 58 on the support 56 and by the rocking movement which then takes place on this bearing element 58, assuming the weight is to be transferred from the support 60 to the support 59. This addition of suitable surface portions for oscillation will eliminate the disadvantages which so far prevented the use of a circumferentially smooth disc as a loose tilting weight.

It is to be noted, however, that the path of the center of gravity described according to Figure 12 shows that the weight drops and rises during this transfer movement, and that owing to this drop a considerable shock must be absorbed by this receiving support 59,—a feature which is not advantageous in bearing mechanisms where this second support for instance would be formed by the floating bench associated with the beam. A comparison of the path described by the center of gravity of a circular disc having a certain radius with the path of the center of gravity in a disc of much larger radius would indicate that with a larger radius disc this dip in the path of the center of gravity would be flattened out considerably and therefore the force of the shock to be absorbed by the second support would be greatly diminished. It might, therefore, be suggested to select a ring of circular form as a loose-weight, but Figure 13 demonstrates that a ring 61 of large radius but the same weight as the disc is considerably larger, and would be too bulky for practical adaptation.

In the improved form of weight therefore, as for instance shown in Figure 13, the bulk of the weight 62 is concentrated in a mass which has a center of gravity the distance of which from the point of oscillation is approximately equal to the radius of a ring large enough to smoothen the path of the center of gravity remarkably, and to diminish the shock with which the weight bumps against the receiving support while at the same time the entire weight is far less bulky and therefore easier to handle than the ring 61.

In this modification, as illustrated in Figure 13, the bulk of the weight 62 again is integral with the bracket 63, the latter having bearing elements 64, 65 located relatively far below the center of gravity of the entire loose-weight. It will also be seen from this figure as well as from the illustrations of other embodiments that the bearing elements 64, 65 near the ends of the bracket are shaped to facilitate an upward movement or climbing of the loose-weight from one position to a higher one, the distance between the bearing elements 64, 65 on the weight being equal to the distance between the bearing elements 66, 67 on the supports when the latter are at their maximum variation from horizontal alinement.

In this modification furthermore it is the bearing portion on the weight which is receding to permit a projecting element on the support to enter into the recess. Each of the bearing portions, however, is provided with surface elements in angular relation to each other.

In the modification illustrated in Figure 14 the weight 68 and the supports 69, 70 are provided with corresponding surface portions 71, 72 or bearing elements 73, 74 formed to permit a sliding movement of the weight, in addition to the oscillating movement, by which the transfer is completed. But as in all of the other embodiments disclosed, the supports or benches 69, 70 are provided with portions for maintaining the loose-weights thereon in slanting position, with the center of gravity in the plane of action and located inward of the innermost point of support. As in the other forms the bearings have angularly related surface elements to facilitate the tilting movement, whether this be a climbing movement or a descending one.

In order to still further smoothen the movement of transfer from one terminal position to another terminal position and to decrease the shock which must occur when the weight strikes the opposite bench, the modification illustrated in Figure 15 is provided with an additional surface bearing adapted to cooperate with a companion bearing of either support, to act temporarily as center of oscillation. While in the modifications described heretofore the weights and supports each had two cooperating bearings on which the weights were successively supported while being transferred, in the modification illustrated in Figure 15 the weight 75 and supports 76, 77 have each more than two cooperating bearings, whereby the path described by the center of gravity of the weight during the transfer will now be composed of three curves instead of two curves only. It will be seen from the diagrammatic illustration of Figure 15 that in the sequence of oscillations of the weight 75 from one terminal position I to the other, as for instance from the waiting bench 76 to the floating bench 77, there will occur primarily an oscillation of the weight about its bearing element 78 at the left hand outer end of the bracket 79 until a central bearing element 80 of the weight enters into engagement with the additional bearing 81 with which the floating bench 77 is provided, position II, whereupon the oscillation is continued on said bearing 81 until the right hand outer bearing 82 of the weight in transfer engages a corresponding surface bearing 83 of the floating bench 77. The oscillating movement will then again be continued about this right hand outer bearing 82 until the weight enters into a position of rest on the floating bench 77, position III. The intermediate bearing points 81, 84 on the supports 77, 76 are shown to be located at the inward edges of each bench, and in the transfer from a higher to a lower support or vice versa, it is always the intermediate bearing point on the higher support which enters into action for temporarily supporting the loose weight during transfer.

It will be seen therefore that the path of the center of gravity also is composed of three contiguous curves P, R and S, which in their entirety present a relatively smooth appearance without pronounced dip, as contrasted, for instance, with the curves M and N of Figure 11, showing the path of the center of gravity of a disc weight.

In all of these improved weights therefore a high center of gravity is produced, combined with compactness of form. In all of them the transfer movement is carried out in a plurality of steps or stages, to eliminate the shock of transfer to a high degree, and in all of them the weights are held in a position of rest at a slope with the foremost edge raised to facilitate the climbing movement.

Figure 16:
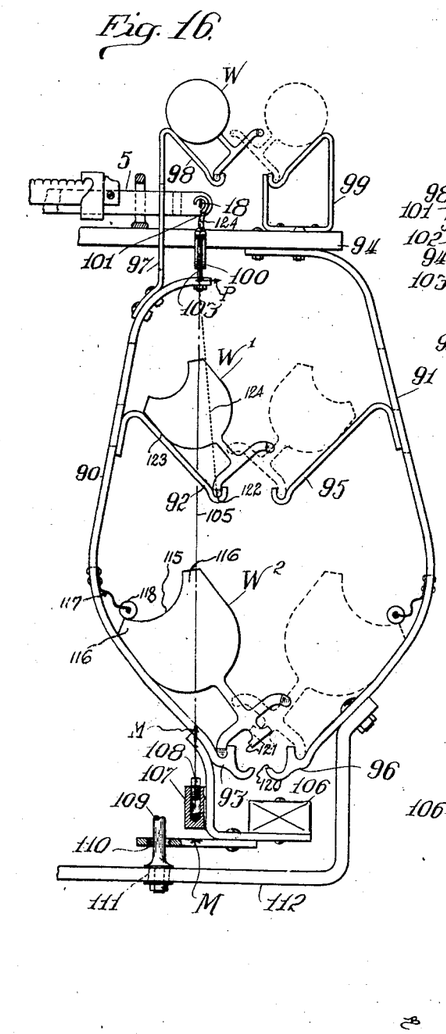
Fig. 16 is a side elevation and partly a section of suspended carriers for weight shelves.
Figure 17:
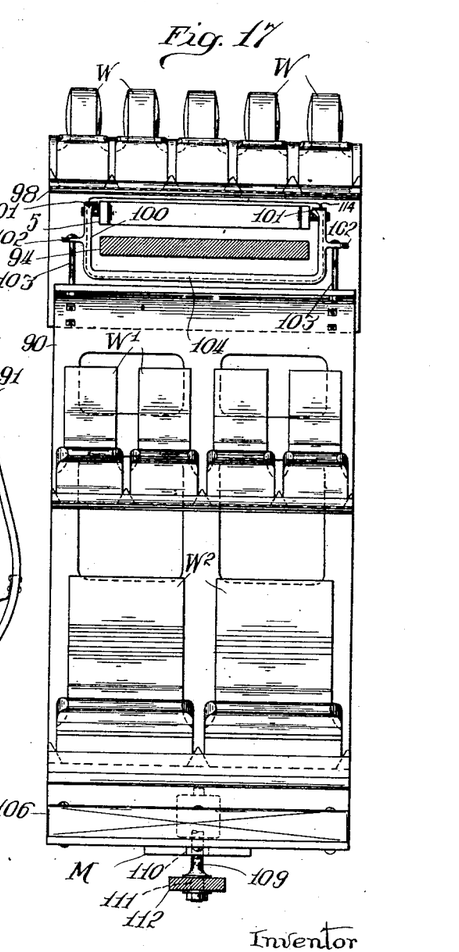
Fig. 17 is an end elevation and partly a section of one of said carriers with its weights and parts of the scale.

In the embodiment of the invention illustrated in Figs. 16 and 17 the scale is being shown equipped with counterweights W, W', $W^2$ of different sizes; carriers 90, 91 for these counterweights are provided with shelves or seats, one shelf for each size and each shelf being adapted to carry the weights thereon side by side. The shelves 92, 93 are arranged in superposition. The carrier 90 is suspended from the beam 5 to hold the counterweights in an operative position, while the other carrier 91 is secured to a fixed part 94 of the scale and is adapted to retain the weights also on superposed shelves 95, 96 in such relation to the other shelves respectively as to support the weights in position ready for tilting.

The shelves 92, 93, 95, 96 extend crosswise of the beam 5 and the carriers 90, 91 confine a space accessible from an end to facilitate the tilting movement of the weights from one bench or shelf to the corresponding opposite bench or shelf. The carrier 90 suspended from the beam also is provided with an upward extension 97 terminating in a bench 98 adapted to carry weight W above the beam, adapted for cooperation with a bracket or shelf 99 secured to the fixed part 94 of the scale and forming an upward continuation of the companion carrier 91. The carriers as well as the shelves preferably are formed of sheet metal.

The suspension means for the carrier 90 movably secured to the beam are advisably arranged in such manner that a swinging movement of this carrier crosswise of its shelves is permitted, and that also a horizontal translation of the shelves parallel to their own length is made possible; the suspension also permits a yielding or resilient twisting movement of this carrier 90 to avoid or minimize the shocks which might occur when the weights are being seated on the carrier, or from other causes.

For this purpose the suspension means include a wide shackle 100 which is hung from the beam by means of bearings 18 extending crosswise of the same, the beam having parallel arms, as illustrated in Fig. 2. The bearings 18 supporting the shackle 100 are axially wide apart from each other and partly embraced by hooks 101 of the shackle, the latter having lugs 102 for the attachment of widely spaced suspension rods 103 which are loosely connected with the upper portion of the hanger 90. A cross bar 104 of the shackle is located below the plane of the lugs 102 for the suspension rods 103. Freedom of movement of the carrier 90 with respect to the beam 5 is enhanced by providing the suspension rods 103 with ball joint heads at both ends, the ends being in engagement with correspondingly shaped seats on the lugs 102 and hanger 90.

The hanger 90, having most of its weight located excentrically relative to the shelves, has a preponderance of weight at one side of the shelves. Such preponderance is however offset by the permanent counterweight 106, attached to the hanger on the other side of the shelves, causing the hanger, when no weights are upon it, to balance about the mark M, or, in other words causing the radius 105 in which the mark M falls (such radius having the axis of the knife edge bearings 18 as its centre) to be vertical.

The shelves or benches throughout the present drawings each comprise the bearing, or "trough" portion 122, Fig. 16, which receives an end of the oscillating base of the weight, and the "slope" portion 123, Fig. 16, against which the head of the weight leans. In the hanger 90 the shelves 92, 93 are so located relative thereto that the "troughs" and the "slopes" are on opposite sides of the radius 105 aforesaid, and each at a requisite distance from such radius, whereby each weight, when in position upon its pertaining shelf, may have its centre of gravity upon this radius. That is to say, the centre of gravity of the hanger, and the centre of gravity of any weight upon it, are in the same radial plane radiating from the axis of the bearing. By virtue of this construction, the hanger, as viewed endwise of the shelves, still balances about the mark M whatever be the number of weights upon it.

The shot pocket 107 secured to the hanger, and evenly disposed about the radius line 105, aforesaid, receives shot in adjustable quantities in order to balance the hanger against the platform of the scale without deflecting the hanger.

The act of transferring, say, the weight $W^1$ from the middle shelf 95 of the companion carrier 91 to the middle shelf 92 of the suspended carrier 90, normally causes a downward shock to the suspended carrier at the moment when the end of the base of the weight strikes the lip 122 of the shelf 92, such stock tending to dull the knife edges 18. The present construction, however, causes such shock to be cushioned, as follows:

Because the trough 122 of shelf 92 is lateral of the radius 105, as hereinbefore explained, the bearing 18, the foot end of suspension rod 103 and the trough 122 of shelf 92 are out of alignment. That is, their connecting line 124 is a broken line. The downward shock aforesaid at trough 122 causes this broken line to somewhat straighten, momentarily, thus momentarily increasing the distance from the bearings 18 to the trough 22, that is to say, allowing the trough 122 to yield downwardly, for the moment, thus cushioning the shock. During such approach of straightening of this broken line the flexible joint at the foot of the suspension rod 103 moves in the direction of the arrow P. If there were no flexible joint in the hanger corresponding to the foot end of the suspension rod 103, at an appreciable distance below the bearing 18, there could be no such cushioning.

Slight oscillatory movement of this carrier is permitted and limited by the guide-pin 109 which projects upward from a fixed part 112 of the scale and has clearance in the aperture 110, in a plate secured to the suspended hanger 90 and located at the side thereof, whereby the operator can always see that there is proper clearance on all sides of the pin. Proper adjustment of the pin 109 relatively to the opening 110 is facilitated since the guiding pin passes through an elongated slot 111 in the rigid part 112, the latter also forming the brace by which the waiting ladder is secured against movement, the brace 112 being attached to a part of the scale which is not shown in the drawing.

Fig. 16 also shows that the hanger 90 suspended from the beam is provided in the extension 97 projecting upward with a relatively large opening 114 through which the beam and the fixed board may project without interfering with the swinging movement of the hanger and extension, nor with their translational movement and twisting movement.

The manipulation of some of the loose-weights, as the weights $W^2$ supported by the carriers 90, 91 is facilitated through the arrangement of concave portions 115 which permit the positioning of a hand or finger therein to transfer these weights. The bulk of the weight portions may, therefore, be described as terminating in prongs 116 which also facilitate the engagement of these weights 102 with means 117 whereby the weights are yieldingly held in either of their terminal positions. These means are illustrated as clips made of spring steel and secured at one end to the wall of the respective hanger while the free end carries a roller 118 adapted to be impinged by the respective prong of a weight when the latter approaches resting position on either hanger, retarding thereby the last portion of the tilting movement of the weight and absorbing a part of the shock which would otherwise occur upon the weight striking the respective carrier.

While in Figs. 16 and 17 a tilting weight $W^2$ is shown similar to the weight illustrated in Fig. 15, and while for this purpose the lowermost seat portions on the hangers are provided with extensions 120 forming intermediate bearings for parts 121 of these weights to support temporarily the weights during the transfer movement from one position to the other, it is obvious that the hangers are not restricted to this form of tilting weights and that other tilting weights may be used in connection with the same. It is also obvious that through the arrangement of these benches, shelves or supports on the hangers in direct opposition to each other and owing to the fact that each shelf is adapted to seat a predetermined size of weight only, the entire arrangement may readily be kept in order and that errors in the computation of the major or loose-weights placed in or withdrawn from operative positions are easily avoided.

I claim:

1. In a scale, the combination with a part of the weighing mechanism, of a loose-weight, a support for holding the loose-weight in inoperative position, and a support on the part of the weighing mechanism for holding it in operative position, the weight having a flat base adapted for tipping movement from one support to the other.

2. In a scale, the combination with a part of the weighing mechanism, of a loose-weight, a support for holding the loose-weight in inoperative position, and a support on the part of the weighing mechanism for holding it in operative position, the weight having sets of supporting surface portions in angular relation to each other, each set being adapted for engagement with one of said supports.

3. In a scale, the combination with a part of the weighing mechanism, of a loose-weight, a support for holding the loose-weight in inoperative position, and a support on the part of the weighing mechanism for holding it in operative position, the loose-weight being provided with surface elements adapted to retain the same in a definite relation to either support.

4. In a scale, the combination with a part of the weighing mechanism, of a loose-weight, a support for holding the loose-weight in inoperative position, and a support on the part of the weighing mechanism for holding it in operative position, the loose-weight being provided with surface elements adapted to restrain the same from movement on either support.

5. In a scale, the combination with a part of the weighing mechanism, of a loose-weight, a support for holding the loose-weight in inoperative position, and a support on the part of the weighing mechanism for holding it in operative position, said loose-weight and supports being each provided with cooperating surface elements adapted to restrain movement of the loose-weight on either support.

6. In a scale, the combination with a part of the weighing mechanism, of a loose-weight, a support for holding the loose-weight in inoperative position, and a support on a part of the weighing mechanism for holding it in operative position, said loose-weight and supports being each provided with complementary surface projecting and receding elements adapted to register with each other when the loose-weight is in position of rest on either support.

7. In a scale, the combination with a part of the weighing mechanism, of a loose-weight, a support for holding the loose-weight in inoperative position, and a support on the part of the weighing mechanism for holding it in operative position, said loose-weight and supports being each provided with cooperating projecting and receding surface portions adapted to act successively as centers of oscillation in the transfer of the loose-weight from either support to the other.

8. In a scale, the combination with a part of the weighing mechanism, of a loose-weight, a support for holding the loose-weight in inoperative position, and a support on the part of the weighing mechanism for holding it in operative position, said supports being each provided with a definite center of oscillation for the weight, and the weight being adapted to oscillate about such centers in succession, and having definitely located surface elements for successive engagement with said centers.

9. In a scale, the combination with a part of the weighing mechanism, of a loose-weight, a support for holding the loose-weight in inoperative position, and a support on the part of the weighing mechanism for holding it in operative position, said supports being each provided with a definite center of oscillation for the weight, and the weight being adapted to oscillate about such centers in succession.

10. A loose-weight for scales adapted for oscillatory movement from operative to inoperative position, consisting of a portion forming the bulk of the weight and of a portion forming the remainder, the last named portion being provided with weight supporting points disposed along two parallel lines about either of which the weight is adapted to oscillate, said last named portion being located closer to the points of oscillation than the first named portion.

11. A loose-weight for scales, having surface bearings adapted to permit tipping movement of the weight from one terminal position to the other, and consisting of a heavy mass and a bracket, the bracket having the bearings of oscillation at one end and the mass at the other end.

12. A loose-weight for scales, having surface bearings adapted to permit tipping movement of the weight from one terminal position to the other, and consisting of a heavy mass and a bracket integral therewith carrying the bearings.

13. A loose-weight for scales, having prongs adapted to permit tipping movement of the weight from one terminal position to the other, and consisting of a heavy mass and a bracket, the bracket having prongs of oscillation at one end and the mass at the other end.

14. A loose-weight for scales adapted for oscillatory transfer from one terminal position to the other, and having a plurality of bearings about which said weight successively oscillates during the transfer, including an element connecting the bearings, and a heavy mass at a distance above the same to render the weight top heavy.

15. A loose-weight for a scale adapted for oscillatory transfer from one terminal position to another and having bearing elements of oscillation, having the bulk of its mass disposed relatively close about its center of gravity, while the bearings of oscillation are located relatively far below such center of gravity.

16. In a scale, the combination with a part of the weighing mechanism of a loose-weight, a support for holding the loose-weight in inoperative position, and a support on a part of the weighing mechanism for holding it in operative position, said loose-weight and supports being each provided with cooperating bearing elements shaped to facilitate a climbing movement in the transfer of the weight from one support to the other.

17. In a scale, the combination with a part of the weighing mechanism, of a loose-weight, a support for holding the loose-weight in inoperative position, and a support on a part of the weighing mechanism for holding it in operative position, the loose-weight and supports being each provided with cooperating bearing elements, the distance between the bearing elements on the weight being equal to the distance between the bearing elements on the supports when the latter are at their maximum variation from horizontal alinement.

18. In a scale, the combination with a part of the weighing mechanism, of a loose-weight, a support for holding the loose-weight in inoperative position, and a support on a part of the weighing mechanism for holding it in operative position, the distance between the bearing elements on the weight being larger than could be obtained on the periphery of a circular disc of the same cross sectional area as the weight.

19. In a scale, the combination with a part of the weighing mechanism, of a loose-weight, a support for holding the loose-weight in inoperative position, and a support on a part of the weighing mechanism for holding it in operative position, the weights and supports having cooperating bearing points on which the weight rests in the terminal positions, and said parts having intermediately located surface elements adapted for temporary mutual engagement during the transfer of the weight from one support to the other.

20. In a scale, the combination with a part of the weighing mechanism, of a loose-weight, a support for holding the loose-weight in inoperative position, and a support on a part of the weighing mechanism for holding it in operative position, the weights and supports having cooperating bearing elements on which the weight oscillates successively in completing the transfer movement from either support to the other, and said weight and support having additional cooperating bearing points adapted to act temporarily as center of oscillation of the weight.

21. In a scale, the combination with a part of the weighing mechanism, of a loose-weight, a support for holding the loose-weight in inoperative position, and a support on a part of the weighing mechanism for holding it in operative position, the weights and supports having each more than two cooperating bearing elements on which the weights are successively supported while being transferred from either terminal position to the other.

22. In a scale, the combination with a part of the weighing mechanism, of a loose-weight, a support for holding the loose-weight in inoperative position, and a support on a part of the weighing mechanism for holding it in operative position, the weights and supports having cooperating bearing elements on which the weight oscillates successively, the elements being arranged to cause the center of gravity of the weight to travel successively through more than two arcs.

23. In a scale, the combination with a part of the weighing mechanism, of a loose-weight, a support for holding the loose-weight in inoperative position, and a support on a part of the weighing mechanism for holding it in operative position, the weights and supports having cooperating inner and outer bearing elements on which the weight oscillates successively, the sequence of oscillations of the weight from one terminal position to the other being an oscillation about one outer bearing element, about one inner, and about the other outer bearing element.

24. In a scale, the combination with a part of the weighing mechanism, of a loose-weight, a support for holding the loose-weight in inoperative position, and a support on a part of the weighing mechanism for holding it in operative position, the weights and supports having each cooperating inner and outer bearing elements, the supports being spaced from each other and having the respective inner bearing elements at their inner edges, and the weights being adapted to successively oscillate about an outer, an inner and the other outer bearing element, while being transferred from one terminal position to another.

25. In a scale a loose-weight, two supports for the loose-weight separated from each other by a clearance space, terminal bearing points and intermediate bearing points on each support, said intermediate points being located at the inward edges of each, one of such supports—the one on the higher support coming into action to temporarily support the loose-weight during transfer from one support to the other.

26. In a scale, a non-circular oscillatable loose-weight, a support for the same movable in a vertical plane of action, the support having a holding portion for maintaining the loose-weight thereon in slanting position with its center of gravity in the said vertical plane of action.

27. In a scale having a non-circular oscillatable loose-weight, weight supporting benches of which one is movable with the beam while the other is not, between which benches the weight is intertransferable, one of the benches at least presenting a supporting surface with a recessed portion and with another portion, on which two portions the weight is held in slanting position on the bench.

28. In a scale a plurality of tiltable loose-weights, supports for the weights between which they may be transferred by a tilting movement, said weights having each a weighted head and a base, the bases being of a width with respect to the heads to impart stability in a direction transverse to the direction of tilt.

29. In a scale having loose-weights, the combination of a pair of supports for the same, said supports being adapted to assume positions at varying elevations relatively to each other, the loose-weights being provided with portions which project while the weights are resting on one support above the other support even though the latter be at a higher elevation and the loose weights being transferable from one support to the other by a tilting movement regardless of the relative position of the two supports.

30. In a scale having loose-weights, the combination of a pair of benches adapted to assume different elevations relatively to each other and adapted to support the weights in such position that a portion of each weight resting on the lower bench projects beyond and above the higher bench even tho the latter is at its maximum elevation relatively to the first named bench and the weights being oscillatably supported on either bench for transfer by tilting movement to the other bench regardless of the relative position of the benches.

31. In a scale having loose-weights, the combination of a pair of benches one of which is movable relatively to the other vertically, the two benches being separated by a gap from each other, each of said benches being adapted to support the loose-weights in a sloping position with a portion of the weights resting on the lower bench projecting above the higher bench.

32. In a scale having supplementary weights, the combination of a pair of oppositely located benches one of which is movable vertically relatively to the other, said benches being each adapted to support the weights in sloping position with a portion of each weight projecting above the opposite bench, the surfaces on the benches being dimensioned and located relatively to the weights so that any weight in being transferred from either bench to the other has a projecting portion which travels in a descent.

33. In a scale having supplementary weights, a fixed bench, and a floating bench movable vertically relatively to the fixed bench, the benches and weights having cooperative supporting surface portions on which the weights rest in sloping position, while other portions of the weights project at an angle towards and above the opposite bench.

34. In a scale having supplementary weights, a fixed bench, and a floating bench opposite thereto and movable vertically above and below the fixed bench, the weights having portions projecting beyond the benches on which they rest and being transferable to either bench from the other by a descending movement of said projecting portions regardless of the relative position of the benches.

35. In a scale having counterweights of different sizes, a carrier for such counterweights having shelves, one shelf for each size of weight, and adapted to preclude the weights thereon from being placed in any position except side by side.

36. In a scale having counterweights of different sizes, a carrier for holding such counterweights in an operative position, another carrier for holding such counterweights in another position, said carriers having shelves, one shelf for each size of weight and adapted to preclude any arrangement of the weights thereon except a side by side arrangement of the weights.

37. In a scale having counterweights of different sizes, a carrier for holding such counterweights in an operative position, another carrier for holding such counterweights in another position, said carriers having shelves, one shelf for each size of weight and adapted to carry the weights thereon side by side, such weights being transferable by tilting from their respective carriers to corresponding shelves on the other carrier.

38. In a scale, having counterweights of different sizes, a carrier for such counterweights having shelves, one shelf for each size of weight, and adapted to preclude any arrangement of the weights thereon except side by side, the shelves being arranged in superposition on the carrier.

39. In a scale having a beam and counterweights of different sizes, a carrier for such counterweights hung from the beam, and having shelves, one shelf for each size of weight, and adapted to preclude any arrangement of the weights thereon except side by side.

40. In a scale having a beam and counterweights of different sizes, a carrier for such counterweights hung from the beam, and having shelves, one shelf for each size of weight, and adapted to carry the weights thereon side by side, said carrier having an upward extension carrying a shelf above the beam and having a gap cut in it, the beam of the scale passing through such gap.

41. In a scale having a beam and counterweights of different sizes, a carrier for holding such counterweights in an operative position, another carrier for holding such counterweights in another position, said carriers having shelves, said shelves extending crosswise of the beam, and the carriers confining between them a space accessible from an end.

42. In a scale a beam, a hanger suspended from the beam and having shelves extending crosswise of the plane of movement of the beam, such shelves carrying counterweights side by side and having portions for retaining the weights in alinement, lengthwise of such shelves, the suspension means for said hanger including a structure permitting swinging motion to the hanger crosswise of the shelves, horizontal translation lengthwise of the shelves, and resilient twisting.

43. In a scale, a beam, a hanger suspended from the beam and having shelves, such shelves carrying counterweights side by side, lengthwise of such shelves, the suspension means for said hanger including a wide shackle, and two suspension elements joining two wide-apart portions of the shackle to two correspondingly located portions of the hanger.

44. In a scale, a beam, a hanger suspended from the beam and having shelves, such shelves carrying counterweights side by side, lengthwise of such shelves, the suspension means for said hanger including a wide shackle, and two suspension elements joining two wide-apart portions of the shackle to two correspondingly located portions of the hanger, such suspension elements being rods with ball joints at their ends.

45. In a scale, a beam, a bearing across the same, a hanger suspended from the beam and having shelves, such shelves carrying counterweights side by side, lengthwise of the hanger, the suspension means for said hanger including a wide shackle, hung from two axially wide-apart portions of the bearing, and two suspension rods flexibly connecting the shackle with the hanger.

46. In a scale, a beam, a part suspended from the beam, the suspension means including a shackle and suspension members, the shackle having hooks and a cross-bar and lugs for the attachment of the suspension members, the cross-bar being at a lower level than the lugs.

47. In a scale, a beam, a bearing, a hanger suspended from the bearing, and having a shelf for counterweights, such shelf having a portion upon which a counterweight normally strikes in the operation of being loaded on to the shelf, and such portions being located laterally of the vertical plane of the axis of the bearing.

48. In a scale, a beam, a bearing, a hanger flexibly suspended from the bearing, and having a shelf for counterweights, such shelf having a portion upon which a counterweight normally strikes in the operation of being loaded on to the shelf, and such portions being located laterally of the vertical plane of the axis of the bearing.

49. In a scale, a beam, a bearing in same, a carrier for counterweights supported on the bearing and having a shelf, such shelf comprising a trough portion and a rest portion, adapted to co-act in the support of a row of counterweights.

50. In a scale, a beam, a bearing in same, a carrier for counterweights supported on the bearing and having a shelf, such shelf comprising a trough portion and a rest portion adapted to co-act in the support of a row of counterweights, such two portions being located on opposite sides of the vertical plane of the axis of the bearing.

51. A scale having counterweights, a bearing, and a hanger hung from such bearing, the hanger having seats for the weights, such seats being so located upon it that the center of gravity of any weight seated upon its pertaining seat, and the center of gravity of the hanger itself, fall in the same radial plane radiating from the axis of such bearing.

52. In a scale having a tiltable loose-weight, a bench supported from the beam of the scale for receiving said loose-weights, and means for yieldingly retaining the weight in position on said bench.

53. In a scale having a tiltable loose-weight, a bench for supporting the same, a carrier on the beam of the scale for said support, and means on the carrier for retarding the tilting motion of said weight to a position of rest on the bench.

54. In a scale having a tiltable weight, a bench supported on a part of the scale for the same, and means for retarding the tilting movement of the weight upon approach of the weight to the bench.

55. In a scale having a tiltable weight, a bench supported on a part of the scale for supporting the weight, and a spring controlled clip adapted to retain the weight in position on the bench.

56. In a scale having a tiltable weight, a bench for supporting the same and mounted on a part of the scale, the weight having a bifurcated portion, and a spring controlled clip fixed in relation to the bench and adapted to engage a prong of the bifurcated portion.

57. A scale weight having a head and a base, the base being provided with longitudinal parallel bearing portions and the head being provided with a depression adapted to facilitate tilting manipulation of the weight about either of said bearing portions.

58. In a scale, a beam, a bearing in same, a non-circular loose-weight, a support for the weight carried on the bearing, and means for maintaining the support in upright position, the support having a holding portion for maintaining the loose-weight thereon in slanting position with its center of gravity in the vertical plane of the bearing.

59. In a scale, a beam, a hanger suspended from the beam and having horizontal shelves, such shelves carrying counterweights side by side, lengthwise of such shelves, the suspension means for said hanger including a structure adapted to permit swinging motion to the hanger lengthwise of the shelves but to keep the shelves horizontal while the hanger so swings.

60. In a scale, a beam, a hanger suspended from the beam and having horizontal shelves, said shelves carrying counterweights side by side lengthwise of said shelves, the suspension means for said hanger including a structure adapted to permit swinging motion to the hanger crosswise of the shelves, and a limited twisting of the hanger.

In witness whereof I affix my signature.

GEORGE HUTCHINSON.